Feb. 12 1924.
C. H. ANDERSON
GLARE ELIMINATOR
Filed Oct. 28, 1922
1,483,763
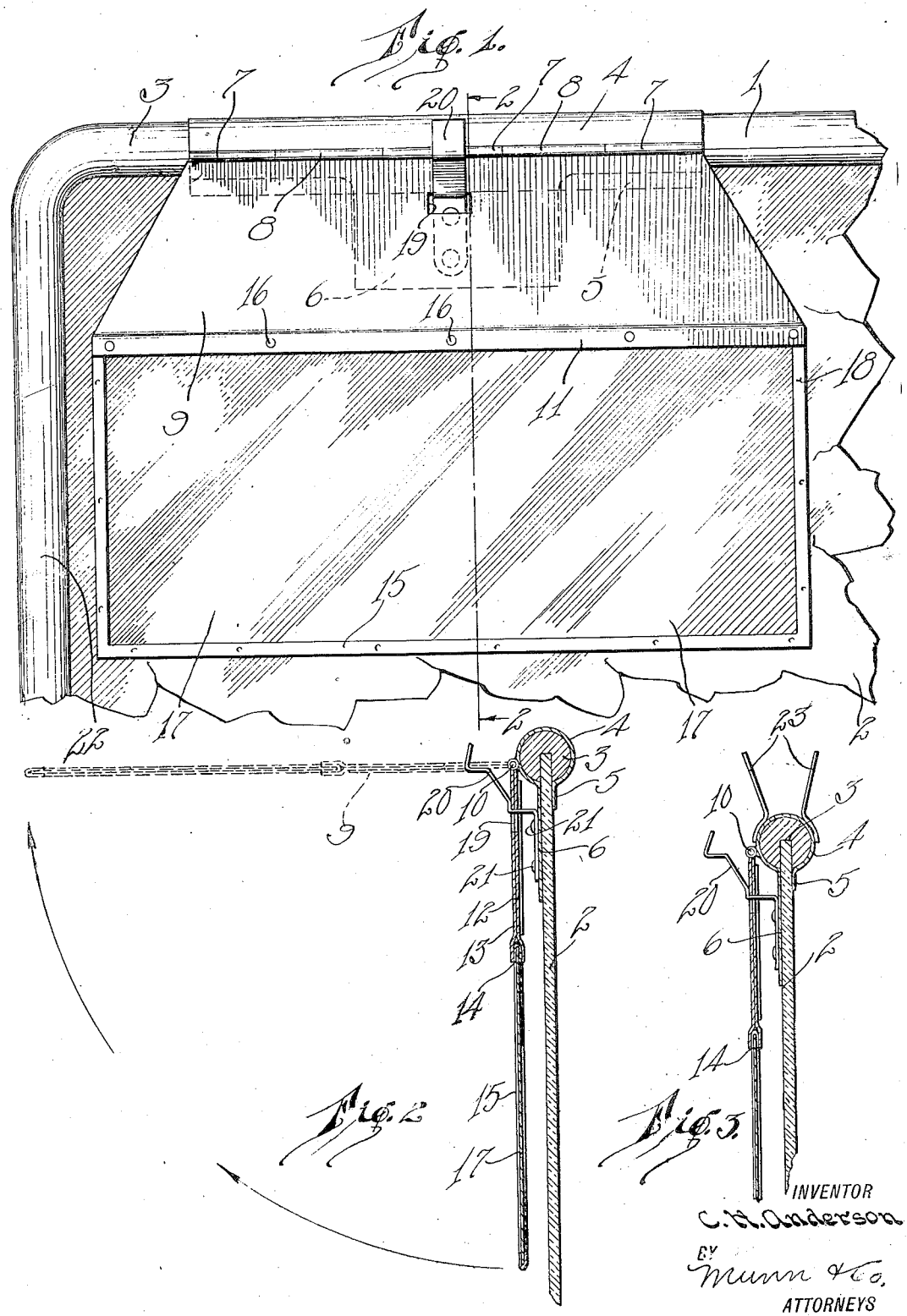
INVENTOR
C. H. Anderson
BY
Munn & Co.
ATTORNEYS Patented Feb. 12, 1924.

1,483,763

UNITED STATES PATENT OFFICE.

CHARLES HENRIC ANDERSON, OF WALWORTH, WISCONSIN.

GLARE ELIMINATOR.

Application filed October 28, 1922. Serial No. 597,640.

*To all whom it may concern:*

Be it known that I, CHARLES HENRIC ANDERSON, a citizen of the United States, and a resident of Walworth, in the county of Walworth and State of Wisconsin, have invented a new and useful Improvement in Glare Eliminators, of which the following is a full, clear, and exact description.

My invention relates to improvements in glare eliminators more particularly that type of glare eliminator which is used upon the wind shield of a motor vehicle, to shut off the glare from the eyes of the driver from an approaching vehicle.

An object of my invention is to provide a device of the character described which is quickly and easily attached and removed to and from a wind shield of the vehicle.

A further object of my invention is to provide a device of the character described in which means is provided for yieldably supporting the shield in a horizontal plane and out of the line of vision of the driver without detaching the device from the wind shield.

A further object of my invention is to provide a device of the character described in which the tinted transparency employed is flexible and not easily damaged by forceful contact therewith.

A further object of my invention is to provide a device that is simple in construction, durable, and efficient for the purpose intended.

Other objects and advantages will appear in the following specification, and the novel features of the invention will be particularly pointed out in the appended claim.

My invention is illustrated in the accompanying drawings forming part of this application, in which—

Figure 1 is a front elevation of an embodiment of my invention,

Figure 2 is a sectional view along the line 2—2 of Figure 1, and

Figure 3 is a fragmentary sectional view of a modified form of my invention.

In carrying out my invention, I make use of the ordinary type of wind shield 1, in which glass 2 is supported to shut off the rush of air as the vehicle is in operation. In the ordinary type of motor vehicle, the glass 2 is clear glass, and no means is provided as by tinting the glass or the like to shut off the glare of the head lights of approaching vehicles while driving at night.

In the ordinary type of wind shield illustrated, the top rail 3 is constructed of tubular material or is substantially circular in cross section as shown in Figure 2.

I provide a clamping member 4 which I choose to call the body member of my device, that is constructed of a resilient metal and which may be sprung over the rail 3 as shown in Figure 2. The body member 4 has one relatively short downwardly extending wall 5 and one relatively long downwardly extending wall 6. The contour of the wall 6 is clearly shown in dotted lines in Figure 1. Both the wall 5 and the wall 6 are normally in close contact with the glass 2 of the wind shield, and therefore any rotation of the body member upon the circular rail 3 is impossible. The body member 4 is provided with hinged portions 7 which are arranged to interlock with the hinged portions 8 on the metal plate 9. A shaft 10 is projected through the hinged portions 7 and serves as a means for rotatably securing the hinged portions 8, and therefore the plate 9. The plate 9 at its upper end is substantially the width of the body member 4, and its side walls taper outward to its lower edge 11. The lower edge 11 is parallel with the shaft 10. From inspection of Figure 2 it will be noted that the plate 9 consists in two interposed plies 12 and 13, and the hinged portions 8 are formed by spreading the folded portion of the single sheet at the point where the sheet is bent upon itself to form the plies. The plies 12 and 13 are bent apart from one another at their lower ends 14, and a frame 15 is riveted thereto by a rivet 16. The transparent sheet 17 is secured in the frame 15 and is held against movement by indentations 18 therein. The sheet 17 is tinted. I prefer to employ an amber tint that is well known to possess the property of obstructing passage of the harmful rays of light, i. e., the longer rays adjacent the violet end of the spectrum.

Upon reference to Figure 1, it will be noted that an opening 19 is provided in the plate 9 and a resilient locking member 20 is projected through the opening 19 and supported by means of rivets 21 to the side walls 6 of the body member 4. The locking member 20 is bent so that it will yieldably hold the plate 9 in the position shown in full lines, to permit the plate to be moved to the position shown in dotted lines, and it will yieldably hold the plate in the position shown in dotted lines.

From the foregoing description of the various parts of the device, the operation thereof may be readily understood. Ordinarily during the day time, when there is no glare in the eyes excepting from the setting or rising sun, the plate 9 is manually moved to the position shown in dotted lines in Figure 2.

However, if the motor vehicle is driving at night, and cars are approaching having powerful head lights, the plate 9 is moved to the position shown in full lines in Figure 2. The locking member 20 will easily yield to manual movement of the plate and serve to hold the plate against accidental movement of its position by vibration or unintentional disturbance. The transparent sheet 17 is then in a position to lie in the path of vision between the eyes of the driver and the approaching motor vehicle, and will effectively subdue the light rays so that no harm is done by temporary blinding of the driver's eyes as is frequently the case where no means is employed to subdue the glare.

It should be noted that the body member may be shifted laterally upon the rail 3 of the wind shield to any position desired, or may even be fastened upon the side wall of the wind shield 22 if desired. In Figure 3 I have shown a modified form of my invention, in which I have added a pair of finger grips 23 by means of which the side walls 5 and 6 of the body member 4 may be moved apart from one another to more easily facilitate the removal of the body member, and attachment to the rail 3.

I claim:

A device of the character described comprising a resilient clamping member adapted to yieldably engage with and be supported upon the rail of a wind shield, a plate hingedly mounted on said clamping member, a frame carried by said plate at the outer end thereof, a sheet of tinted transparent material mounted in said frame, said plate having an opening therethrough adjacent its hinged support, and a resilient strap fixed to said clamping member and arranged to project through the opening in said plate, whereby said plate may be frictionally held in predetermined positions by the engagement of said strap therewith.

CHARLES HENRIC ANDERSON.